United States Patent Office 2,997,467
Patented Aug. 22, 1961

2,997,467

DIAZO NITROGEN HETEROCYCLES AS LITHOGRAPHIC SENSITIZERS

Robert J. Cox, Chenango Bridge, Ralph G. D. Moore, Chenango Forks, and Mark L. Moskowitz, Endicott, N.Y., assignors to General Aniline & Film Corporation, New York, N.Y., a corporation of Delaware No Drawing. Filed Apr. 21, 1958, Ser. No. 729,495
2 Claims. (Cl. 260—239.9)

This invention relates to photomechanical reproduction and more particularly to diazo nitrogen heterocycles as lithographic sensitizers therefor.

The use in the lithographic art of diazo compounds for the preparation of light sensitive layers for photomechanical reproduction is well-known. In their earliest application, these compounds were employed in conjunction with hydrophilic colloids such as gelatin, and the like, with the idea of utilizing their ability to harden the colloids under exposure to light to thereby render the colloid ink-receptive in the hardened areas. More recently, it has been found possible to dispense with the colloid and employ the photodecomposition product of the diazo itself to form an ink-receptive image, for example, on metal surfaces. The diazo compounds heretofore found useful in such application are generally characterized by the fact that while the photodecomposition product is highly water resistant and, hence, ink- or grease-receptive, the diazos, per se, are usually readily soluble and removable by treatment with water.

It has been possible to prepare printing plates in this manner which function satisfactorily to some extent. However, the performance of such plates is far from optimum due to poor stability, especially in the absence of a colloid, of the diazo coated but unprocessed plates. Consequently, considerable research has been directed toward the finding of diazos which would permit the formation of printing plates having a long working life and free from the objections inherent in those utilizing the water soluble diazos.

In the co-pending application Serial Number 572,835, filed on March 21, 1956, is described the preparation of light sensitive layers which yield excellent printing images by the use of water insoluble diazo compounds which are heterocyclic nitrogenous bases wherein a carbon atom in the hetero ring bears the grouping $=N_2$. These diazos have great affinity for printing inks and though water insoluble may be applied to the surfaces of the plate from a variety of organic solvents. Of equal importance is the fact that the light decomposition products of said diazos exhibit a marked difference in solubility from the diazos, per se, and hence, an image may be developed after exposure without damage to the ink-receptive areas.

Whereas certain diazo derivatives of heterocyclic nitrogenous bases are known compounds, the diazo derivatives described herein have not hithertofore been prepared and are patentably new entities.

It is therefore an object of this invention to provide new diazo derivatives of heterocyclic nitrogenous bases useful as lithographic sensitizers.

It is a further object of this invention to provide a process for preparing said lithographic sensitizers.

Other objects will appear as the description proceeds.

The diazo heterocyclic bases of this invention may be represented by the following general formulae:

(I)

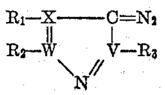

and (II)

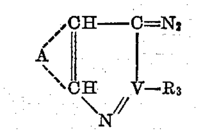

in which $R_1X$, $R_2W$ and $R_3V$ may be

N, C—H, C-aromatic in which the aromatic radical is phenyl; naphthyl; halogenphenyl, i.e., bromophenyl, chlorophenyl, etc.; alkylene dioxyphenyl, i.e., methylene dioxyphenyl; biphenylyl; phenylsulfonamidophenyl; N-methylphenylsulfonamidophenyl; acylaminophenyl, i.e., acetamidophenyl; alkylsulfonylphenyl, i.e., methylsulfonylphenyl; arylsulfinylphenyl, i.e., phenylsulfinylphenyl; alkenylphenyl, i.e., vinylphenyl, and A represents the atoms necessary to complete a benzo ring system, it being understood that the hetero ring shall contain no more than three nitrogen atoms.

The compounds embraced by Formula I and II may be more specifically defined by the following formulae:

3-diazo-3H-pyrrolenines

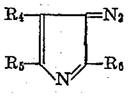

(I)

4-diazo-4H-isoimidazoles (II)

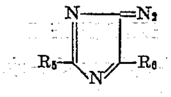

4-diazo-4H-isopyrazoles (III)

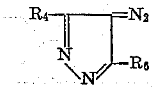

Diazoindiazoles (IV)

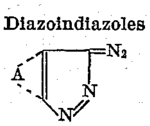

wherein $R_4$, $R_5$ and $R_6$ may be hydrogen, aryl, i.e., phenyl, naphthyl, halophenyl, i.e., bromophenyl, chlorophenyl, etc.; alkylenedioxyphenyl, i.e., methylenedioxyphenyl; biphenyl; phenylsulfonamido; N-methylphenylsulfonamidophenyl; acylaminophenyl, i.e., acetamidophenyl; alkylsulfonylphenyl, i.e., methylsulfonylphenyl; arylsulfinylphenyl, i.e., phenylsulfinylphenyl, and A represents the carbon atoms necessary to complete the benzo ring in which the said benzo ring contains a constituent such as benzo, phenyl, p-lower alkylaminophenylsulfonamido and halogen.

In the following list are depicted examples of the new diazos which are particularly useful as lithographic sensitizers.

3-diazo-2,4-diphenyl-3H-pyrrolenine
2-p-chlorophenyl-3-diazo-4,5-diphenyl-3H-pyrrolenine
3-diazo-4,5-diphenyl-2-(1-naphthyl)-3H-pyrrolenine
4,5-bis(3,4-methylenedioxyphenyl)-3-diazo-2-phenyl-3H-pyrrolenine
2,5-bis(p-chlorophenyl)-3-diazo-3H-pyrrolenine
p-(3-diazo-4,5-diphenyl-3H-pyrrolenin-2-yl)phenyl methyl sulfone
4'-(3-diazo-4,5-diphenyl-3H-pyrrolenin-2-yl)acetanilide
2-(4-biphenylyl)-3-diazo-4,5-diphenyl-3H-pyrrolenine
N-methyl-4'-(3-diazo-4,5-diphenyl-3H-pyrrolenin-2-yl)benzenesulfonanilide p-(3-diazo-4,5-diphenyl-3H-pyrrolenin-2-yl)styrene
p-(3-diazo-4,5-diphenyl-3H-pyrrolenin-2-yl)phenyl phenyl sulfoxide
4'-(3-diazo-5-indiazolylsulfamoyl)acetanilide
4-diazo-2,5-diphenyl-4H-isoimidazole
3-diazo-5,7-dibromoindiazole
1-diazo-1-benz(e)indiazole
3-diazo-6-phenylindiazole
4-diazo-3,5-diphenyl-4H-isopyrazole In most instances, the starting material for the production of the diazos contemplated herein are known compounds and are described in the chemical literature and reference is made thereto in the detailed portion of the application.

In general, the 3-diazo-3H-pyrrolenines were obtained from the appropriate pyrrole derivatives by the steps: nitrosation to the nitrosopyrrole, reduction to the amine, diazotization followed by neutralization of the diazonium salt with mild alkali to form the $>C{=}N_2$ grouping.

The 4-diazo-4H-isoimidazoles were obtained by diazotizing 4-aminoimidazoles and treating the resulting diazonium salts with mild alkali as described above to form the $>C{=}N_2$ grouping.

The 4-diazo-4H-isopyrazole was produced from the appropriate pyrazole derivative by the steps: nitration to 4-nitropyrazole, reduction to the amine, diazotization followed by treating with mild alkali to form the $>C{=}N_2$ linkage.

The diazoindiazoles were obtained from the requisite 3-aminoindole followed by diazotization and treatment with mild alkali.

The following examples will serve to illustrate the preparation of our invention but it is understood that no limitation or restriction is imposed thereto:

EXAMPLE I

*3-diazo-2,4-diphenyl-3H-pyrrolenine*

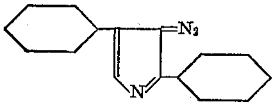

This compound was prepared by diazotizing 3-amino-2,4-diphenylpyrrole (Gabriel, Ber. 41, 1132–40 (1908)) in acetic acid solution with aqueous sodium nitrite. Addition of water precipitated yellow crystals which are sensitive to light and melted with decomposition at 170° C.

EXAMPLE II

*2-p-chlorophenyl-3-diazo-4,5-diphenyl-3H-pyrrolenine*

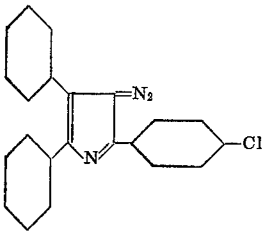

This light sensitive compound was made in the following way: 4'-chloroacetophenone and benzoin were condensed by refluxing in aqueous ethanol with added potassium cyanide. The 4-p-chlorophenyl-1,2-diphenyl-1,4-butanedione formed, after recrystallization from isopropyl alcohol, melted at 111–112° C. This was cyclized to 5-p-chlorophenyl-2,3-diphenylpyrrole, M.P. 124–125° C., by refluxing with ammonium acetate in acetic acid. The pyrrole was converted by the action of alcoholic butyl nitrite and alkali to 2-p-chlorophenyl-4,5-diphenyl-3-nitrosopyrrole, M.P. 228–229° C. with decomposition. This was reduced over palladium on carbon in acetic acid to 3-amino-2-p-chlorophenyl-4,5-diphenylpyrrole which, without isolation, was diazotized with aqueous nitrite to the desired compound. It was isolated by pouring the acetic acid solution into water, adding sodium acetate, filtering, washing and drying, and melted at 119–121° C. with decomposition.

EXAMPLE III

*3-diazo-4,5-diphenyl-2-(1-naphthyl)-3H-pyrrolenine*

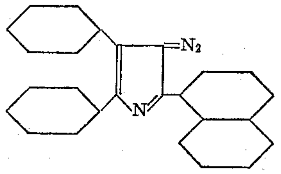

2,3-diphenyl-5-(1-naphthyl)pyrrole (Smith, Am. Chem. J. 22, (1899)) was prepared by the action of ammonium acetate in boiling acetic acid on 2-desyl-1'-acetonaphthone. It was nitrosated at low temperature in alcoholic solution with isoamyl nitrite in the presence of sodium ethylate to 4,5-diphenyl-2-(1-naphthyl)-3-oximino-3H-pyrrolenine, which was isolated by drowning the reaction solution, after it had stood overnight, in water, acidifying to pH 5, collecting the crude product, and recrystallizing from aqueous isopropyl alcohol, 80% by volume. The yellowish brown crystals, melting at 160° C. with decomposition, were reduced in acetic acid over palladium on carbon catalyst, and the reduced, filtered solution was diazotized with aqueous sodium nitrite solution. The solution was then drowned in water and treated with sodium acetate solution to give orange-colored light sensitive crystals which melted at 150° C. with decomposition.

EXAMPLE IV

*4,5-bis(3,4-methylenedioxyphenyl)-3-diazo-2-phenyl-3H-pyrrolenine*

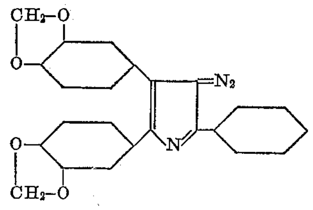

1,2 - bis(3,4 - methylenedioxyphenyl) - 4 - phenyl-1,4-butanedione (Smith, Ann. 289, 324 (1896)) was cyclized by refluxing for about six hours in acetic acid with ammonium acetate to 2,3-bis(3,4-methylenedioxyphenyl)-5-phenylpyrrole, M.P. 214–215° C. This was nitrosated with butyl nitrite and alkali in aqueous ethanol to 4,5-bis(3,4 - methylenedioxyphenyl) - 3 - oximino-2-phenyl-3H-pyrrolenine, M.P. about 220° C. with decomposition, which was reduced catalytically in acetic acid to the corresponding amine. This was diazotized in acetic acid without isolation to the desired photosensitive compound. It could also be obtained by reducing and subsequently diazotizing the yellow 4,5-bis(3,4-methylenedioxyphenyl)-3-nitro-2-phenyl-3H-pyrrolenine, M.P. 228–230° C., obtained from the above pyrrole by the action of excess butyl nitrite in boiling ether. The product decomposed over a wide range starting at about 120° C.

EXAMPLE V

*2,5-bis(p-chlorophenyl)-3-diazo-3H-pyrrolenine*

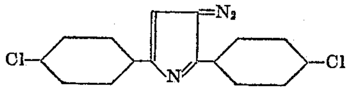

In order to make this compound, M.P. 124–126° C., 1,4-bis(p-chlorophenyl)-2-butene-1,4-dione (Conant and Lutz, J. Am. Chem. Soc. 45, 1305 (1923)) was reduced in boiling methanol with dithionite to 1,4-bis(p-chlorophenyl)-1,4-butanedione, M.P. 151–152° C. The subsequent operations were similar to those described in Example II: cyclization to the pyrrole, M.P. 181.5–183° C., nitrosation to the nitrosopyrrole, M. P. 223–224° C., reduction, and diazotization.

EXAMPLE VI

*p-(3-diazo-4,5-diphenyl-3H-pyrrolenin-2-yl)phenyl methyl sulfone*

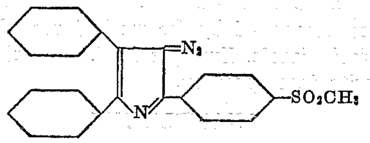

4' - methylsulfonylacetophenone (Burton and Hu, J. Chem. Soc. 1948, 601–3) was condensed with benzoin in boiling aqueous ethanol in the presence of a small amount of potassium cyanide to 1,2-diphenyl-4-(p-methylsulfonylphenyl)-1,4-butanedione. This was cyclized with ammonium acetate in boiling acetic acid to p-(4,5-diphenyl-2-pyrryl)phenyl methyl sulfone which melted at 248–251° C. and analyzed as follows: C, 74.02%; H, 5.20%; N, 3.83%; calculated—C, 74.0%, H, 5.1%, N, 3.8%. It proved impractical to nitrosate with butyl nitrite in the way found useful with many other pyrroles but the use of solid sodium nitrite in acetic acid gave the desired intermediate. This was reduced in acetic acid with zinc dust and the filtered solution was treated with sodium nitrite solution. Upon dilution with water and addition of sodium acetate solution, the desired diazo separated as a yellow, light sensitive solid.

EXAMPLE VII

*4'-(3-diazo-4,5-diphenyl-3H-pyrrolenin-2-yl) acetanilide*

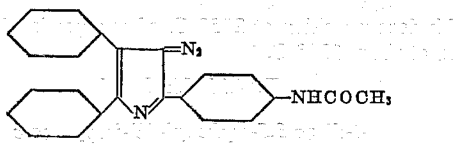

4'-acetylacetanilide was condensed in aqueous isopropyl alcohol with benzoin in the presence of potassium cyanide to 4'-desylacetylacetanilide. The crude product was cyclized with ammonium acetate in acetic acid to 4'-(4,5-diphenyl-2-pyrryl) acetanilide. This was obtained by recrystallization from isopropyl alcohol as greenish crystals which had no definite melting point below 227° C. This intermediate was nitrated in ether-dioxane with butyl nitrite to 4'-(4,5-diphenyl-3-nitro-2-pyrryl)acetanilide which was reduced catalytically in acetic acid over palladium on carbon. The acetic acid solution of the resulting amine was diazotized with aqueous sodium nitrite solution, the yellow photosensitive product being isolated by pouring into water and adding sodium acetate solution until the pH was 5. The compound melted with decomposition in the neighborhood of 130° C.

EXAMPLE VIII

*2-(4-biphenylyl)-3-diazo-4,5-diphenyl-3H-pyrrolenine*

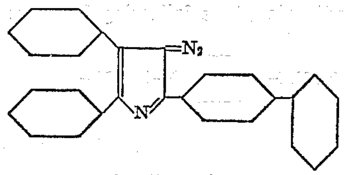

Preparation of this light sensitive compound was accomplished as follows: 4'-phenylacetophenone (Long and Henze, J. Am. Chem. Soc. 63, 1939–40 (1941)) was condensed with benzoin in aqueous ethanol in the presence of potassium cyanide to 2-desyl-4'-phenylacetophenone, a resinous solid which resisted crystallization. This was cyclized by refluxing with about five parts acetic acid containing 1.6 parts ammonium acetate. The resulting 5-(4-biphenylyl)-2,3-diphenylpyrrole was isolated by adding water, extracting the solid with hot ethanol, and recrystallizing from benzene. It melted at 208–210° C. and gave the following analysis:

| Element | Calcd. | Found |
|---|---|---|
| C | 90.56 | 90.07 |
| H | 5.66 | 5.96 |
| N | 3.77 | 4.08 |

This pyrrole was then nitrosated, reduced, and diazotized by procedures similar to those already described in Example II. The light sensitive product melted in the range 125–130° C. with decomposition.

EXAMPLE IX

*N-methyl-4'-(3-diazo-4,5-diphenyl-3H-pyrrolenin-2-yl) benzenesulfonanilide*

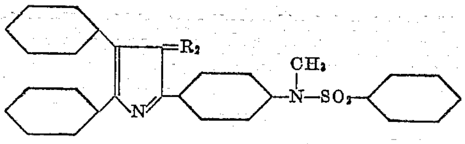

The starting point in the synthesis was the condensation in aqueous sodium hydroxide of benzenesulfonyl chloride and 4'-aminoacetophenone to give 4'-acetylbenzenesulfonanilide. Recrystallized from ethanol, this melted at 132–134° C. It was methylated in aqueous sodium hydroxide solution to N-methyl-4'-acetylbenzenesulfonanilide which, after recrystallization from ethanol, melted at 110–111° C. Refluxed in aqueous ethanol with benzoin and potassium cyanide, this reacted to give N-methyl-4'-desylacetylbenzenesulfonanilide, M.P. 134–135° C. from ethanol. Cyclization to the pyrrole, M.P. 202–203° C., from ethanol-acetone, with ammonium acetate and acetic acid was carried out as described in earlier examples. Nitrosation was accomplished in glacial acetic acid with solid sodium nitrite. The nitrosated compound was reduced with zinc dust in acetic acid to the amino derivative which, without isolation, was diazotized in acetic acid with aqueous sodium nitrite. The photosensitive product, melting in the range 100–110° C. with decomposition, was precipitated by the addition of aqueous sodium acetate solution.

EXAMPLE X

*p-(3-diazo-4,5-diphenyl-3H-pyrrolenin-2-yl)styrene*

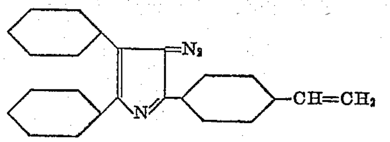

4'-vinylacetophenone (Kenyon, Waugh, and Unruh, U.S. Patent 2,713,570) was reacted with benzoin under the conditions described in earlier examples to form 2-desyl-4'-vinylacetophenone which, without purification, was cyclized with ammonium acetate to p-(4,5-diphenyl-2-pyrryl)styrene. This was converted by the action of butyl nitrite and alkali into p-(4,5-diphenyl-3-nitroso-2-pyrryl)styrene which was reduced and diazotized in the usual way to give a yellow, photosensitive product which slowly decomposed above 125° C.

EXAMPLE XI

*p-(3-diazo-4,5-diphenyl-3H-pyrrolenin-2-yl) phenyl phenyl sulfoxide*

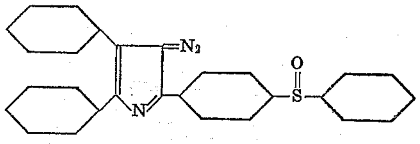

4'-phenylsulfinylacetophenone (Szmant and Palopoli, J. Am. Chem. Soc. 72, 1757 (1959)) was condensed in the usual way with benzoin to give 2-desyl-4'-phenylsulfinylacteophenone which was cyclized with ammonium acetate in acetic acid to 2,3-diphenyl-5-p-phenylsulfinylphenylpyrrole, M.P. about 195° C. This was nitrosated in acetic acid with aqueous sodium nitrite and the crude nitroso intermediate was reduced in acetic acid with zinc dust. The filtered acetic acid solution was then treated with aqueous sodium nitrite solution and the product was precipitated with water. It melted with decomposition in the range 96–110° C.

EXAMPLE XII

*4'-(3-diazo-5-indiazolylsulfamoyl)acetanilide*

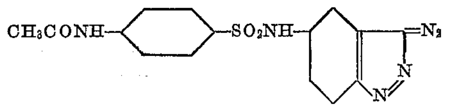

4'-(5-isoindazolylsulfamoyl)acetanilide (Kwartler and Lucas, J. Am. Chem. Soc. 65, 1804–6 (1943)) was coupled in alkaline solution with benzene diazonium chloride to form the red dyestuff 4'-(3-phenylazo-5-isoindazolylsulfamoyl)acetanilide which melted at about 155–160° C. after some decomposition at lower temperatures. This was reduced in alkaline aqueous solution with dithionite to 4'-(3-amino-5-isoindazolylsulfamoyl) acetanilide which was precipitated by acidification with acetic acid. The crude amine was slurred with dilute hydrochloric acid and diazotized with sodium nitrite solution. The light sensitive product was precipitated by the addition of aqueous sodium carbonate in the form of brownish crystals which decomposed at about 98° C.

EXAMPLE XIII

*4-diazo-2,5-diphenyl-4H-isoimidazole*

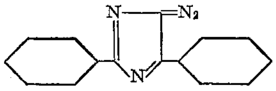

This light sensitive compound was obtained by diazotizing 4-amino-2,4-diphenylimidazole hydrochloride (Cook, Davis, Heilbron, and Thomas, J. Chem. Soc. 1949, 1071–4) in acetic acid solution with aqueous sodium nitrite solution. The solution was buffered with sodium acetate and refrigerated. The yellow product was isolated in the usual way. It melted at 75–80° C. with decomposition.

EXAMPLE XIV

*3-diazo-5,7-dibromoindiazole*

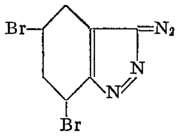

To prepare this, 2-amino-3,5-dibromobenzonitrile (Bogert and Hand, J. Am. Chem. Soc. 25, 937 (1903)) was diazotized and reductively cyclized to 3-amino-5,7-dibromoindiazole by methods essentially the same as those used by Bamberger (Ber. 32, 1779 ff. (1899)) for the preparation of 3-aminoindiazole. The diazotization was also essentially the same as that described in the above citation. The product, purified by precipitation from acetic acid solution with water, melted in the range 148–154° C. with decomposition.

EXAMPLE XV

*1-diazo-1-benz(e)indiazole*

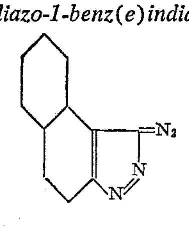

This was prepared as follows: N-(1-cyano-2-naphthyl) acetamide, made according to French Patent 828,202 (I. G. Farb. A. G.), Ex. 19, was deacetylated with sodium hydroxide in aqueous isopropyl alcohol to 2-amino-1-naphthonitrile. This was diazotized and reductively cyclized with stannous chloride to 1-amino-1-benz(e)indiazole, M.P. 126–128° C. which was converted to the desired compound by the method used for 3-diazo-5,7-dibromoindiazole, Example XIV. It melted at 140–143° C. with decomposition.

EXAMPLE XVI

*3-diazo-6-phenylindiazole*

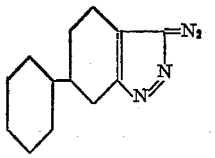

3-amino-4-biphenylcarbonitrile (Jones, J. Org. Chem. 10, 537 (1945)) was diazotized and reductively cyclized with stannous chloride to 3-amino-6-phenylindiazole, M.P. 228–230° C. By analysis, this was found to contain C, 74.64%; H, 5.35%; N, 19.84%; calculated—C, 74.61%; H, 5.30%; N, 20.08%. This intermediate was then diazotized in dilute aqueous hydrochloric acid. The resultant yellow slurry was treated with sodium acetate solution and the product was isolated as usual. It was purified by dissolving in dilute hydrochloric acid and precipitating with sodium acetate solution in the form of fine yellow crystals which were sensitive to light and melted with decomposition at 235° C. after a partial decomposition at about 130° C.

EXAMPLE XVII

*4-diazo-3,5-diphenyl-4H-isopyrazole*

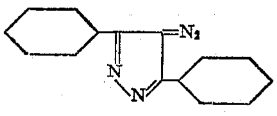

3,5-diphenyl-4H-isopyrazole was prepared by reaction of 1,3-diphenyl-1,3-propanedione with hydrazine hydrate (Wislicenus, Ann. 308, 254 (1899)). Addition of this isopyrazole to nitric acid (D=1.49) below 3° C. followed by drowning in water yielded 3,5-diphenyl-4-nitro-4H-isopyrazole, M.P. 263–266° C. (from isopropyl alcohol). The amino compound obtained from this by reduction in acetic acid over palladium on carbon was diaotized without isolation with aqueous sodium nitrite. Dilution of the yellow-red diazotized mixture with ammonium hydroxide yielded the light sensitive diazo compound.

We claim:

1. An indiazole of the following formula:

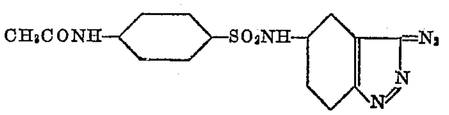

2. An indiazole of the following general formula:

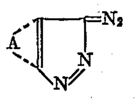

wherein A represents the carbon atoms necessary to complete the benzo ring in which the said benzo ring contains a substituent selected from the class consisting of benzo, phenyl, p-lower alkylamidophenylsulfonamido and halogen.

References Cited in the file of this patent

Angelico et al.: Gazz. Chim. Ital., vol. 67, pp. 633–637 (1937).

Castellana et al.: Gazz. Chim. Ital., vol. 36 (II), pp. 56–62 (1906).

Seidel: Berichte Deutsche Chemische Gesellschaft, vol. 77, pp. 797–802 (1944).